Jan. 6, 1931.　　W. A. O'BANNON　　1,787,834
SUCKER ROD SOCKET
Filed March 6, 1928
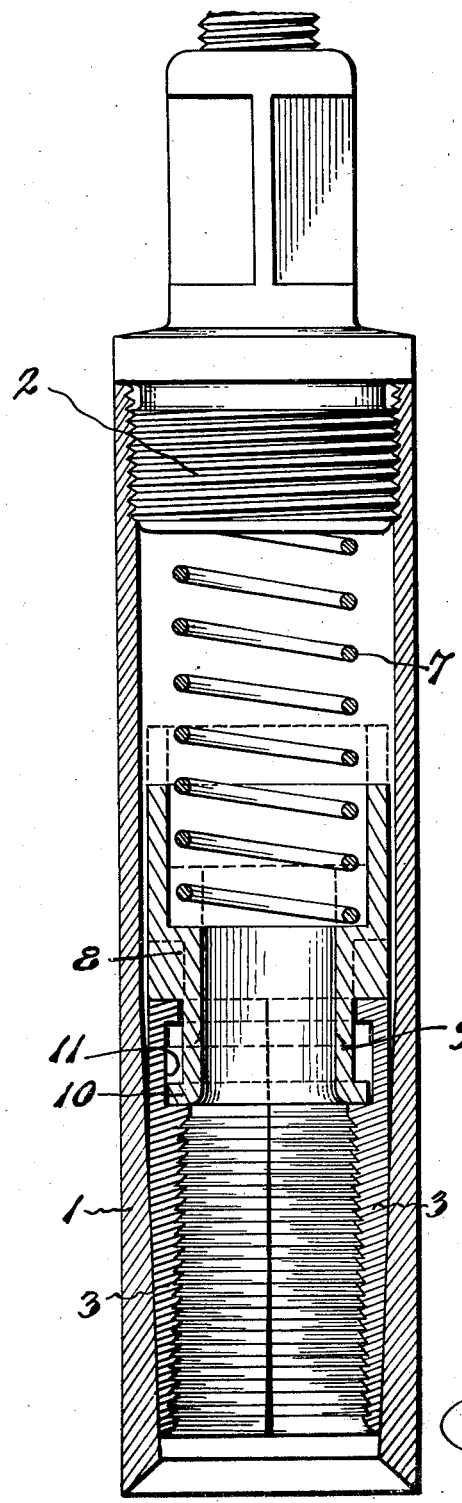
INVENTOR
W. A. O'Bannon
By
Robb & Robb
ATTORNEYS Patented Jan. 6, 1931

1,787,834

UNITED STATES PATENT OFFICE

WALTER A. O'BANNON, OF TULSA, OKLAHOMA, ASSIGNOR TO WALTER O'BANNON CO., A CORPORATION OF OKLAHOMA

SUCKER-ROD SOCKET

Application filed March 6, 1928. Serial No. 259,544.

The present invention apertains to improvements in fishing tools of the type known as sucker rod sockets, and it has for its object to provide a socket of simple construction in which there is provided a slip unit composed of a plurality of sections, together with means associated with said slip unit for preventing the longitudinal displacement of one of said sections with relation to the other and for limiting the longitudinal movement of the slip unit during the fishing operation.

Other and further objects and advantages of the invention will be hereinafter set forth and the novel features thereof defined by the appended claims.

In the drawings, the figure is a longitudinal sectional view of a sucker rod socket constructed in accordance with my invention.

The device which forms the subject matter of this application comprises the conventional barrel or bowl 1 which is threaded internally at its upper end to receive the connector head 2. At the lower end the barrel is internally tapered to provide a slip seat, and with this seat a slip unit 3 coacts, said unit being composed of a plurality of complemental sections. The slip unit is formed with a wickered bore which may be a straight bore or a tapered bore, depending upon the purpose for which the slip unit is intended. That is to say, as is well known in this art, the bore may be tapered to provide for catching sucker rods of different sizes and the bore may be of a relatively large diameter for fishing rods which have been broken adacent the joint or box, or with a relatively small bore for engaging breaks intermediate the length of the rod sections.

In the form of the invention herein illustrated, the slip unit is provided with a follower 8 having a reduced extremity 9 at its lower end which terminates in an annular flange 10. The extremity 9 extends into the upper end of the slip bore and the flange 10 engages in an internal groove 11 formed in the slip unit, said groove being wider than the flange 10 of the follower so as to provide for a slight relative movement of the follower for the purpose hereinafter more particularly set forth. This follower is of ring-like form and constitutes a seat for the spring 7 which is interposed between the follower and the head 2 for the socket. The spring 7 tends to hold the follower with its flange at the lower part of the groove 11 and furthermore tends to hold the slip unit 3 in its lowermost position. The upper skirted end of the follower is of sufficient length to coact with the connector head for the socket whereby to limit the longitudinal movement of the slip unit so as to preclude movement of the slip entirely out of the tapered portion of the barrel. In addition to this, this upper portion of the follower by virtue of its coaction with the connector head 2 prevents the spring 7 from being crushed when the slip unit is moved upwardly in the barrel during the fishing operation.

The purpose of the relative movement between the follower and the slip unit, as hereinbefore referred to, is to impart to the slip unit a slight jarring action in the event the slip unit becomes more or less firmly seated in the tapered portion of the barrel during the fishing operation. In such operation a considerable amount of weight is imposed upon the slip unit, as when lifting a long line of rods, so that it sometimes occurs that the sections of the slip unit become slightly wedged in the tapered seat of the barrel. However, with the arrangement shown, it is possible to impart a jarring to the slip unit by hammering on the top end of the barrel which readily displaces the slip unit from its wedged seat. This may be accomplished when the rods have been raised out of the well sufficiently far to permit the broken section to be disconnected. The broken section engaged by the fishing tool is then preferably disconnected and placed in a suitable clamping device such as a vise. The connector head and spring are removed from the fishing tool to permit an effective jarring of the slip unit by striking a sharp blow on the connector head end of the barrel.

Having thus described my invention, what I claim as new and desire to secure by Letters Patent of the United States is:—

1. A sucker rod socket of the class described comprising a barrel having a tapered seat at the lower end thereof, a sectional slip unit mounted in said barrel on said seat, and means coacting with said slip unit to prevent longitudinal displacement of the sections of the unit, said means being shiftable relative to the unit for effecting displacement of the said slip unit from its seat.

2. A sucker rod socket of the class described comprising a barrel, a sectional slip unit mounted therein and having a groove at the upper end thereof, and a ring like member cooperating with said unit and interlocking in the groove aforesaid, said member being shiftable longitudinally of the barrel to jar the slip unit when the latter becomes wedged in its seat.

3. A sucker rod socket of the class described comprising a barrel, a slip unit mounted therein, a holder member interlocking with said slip unit and having relative movement longitudinally with relation to said unit, and spring means coacting with the holder member to hold the slip unit normally at the lower end of the barrel.

4. A sucker rod socket of the class described, comprising a barrel, a connector head attached to one end thereof, a slip unit mounted in said barrel, and a holder member longitudinally shiftable with respect to and interlocking with said slip unit and having an extension at one end adapted to coact with the head to limit the upward movement of the slip unit in the barrel.

5. A sucker rod socket of the class described, comprising a barrel, a connector head attached to one end thereof, a slip unit mounted in said barrel, a holder member longitudinally shiftable with respect to and interlocking with said slip unit and having an extension at one end adapted to coact with the head to limit the upward movement of the slip unit in the barrel, and a spring intermediate the slip unit and the head, said extension constituting a receiving seat for the spring and functioning to prevent crushing of said spring when the slip unit is moved to its uppermost position.

In testimony whereof I affix my signature.

WALTER A. O'BANNON.